F. E. HARTHAN.
REVERSING CLUTCH MECHANISM.
APPLICATION FILED JAN. 8, 1908.

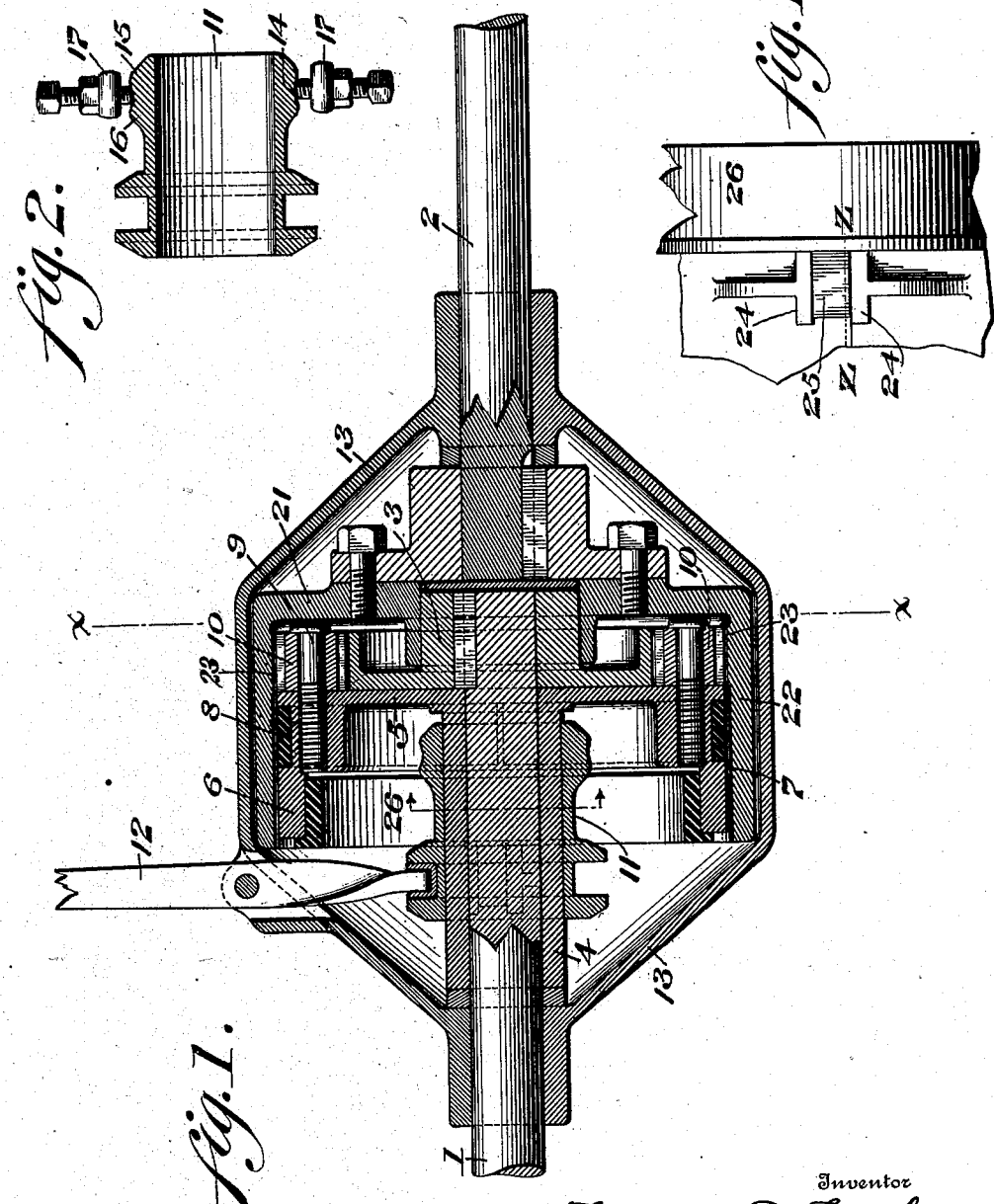

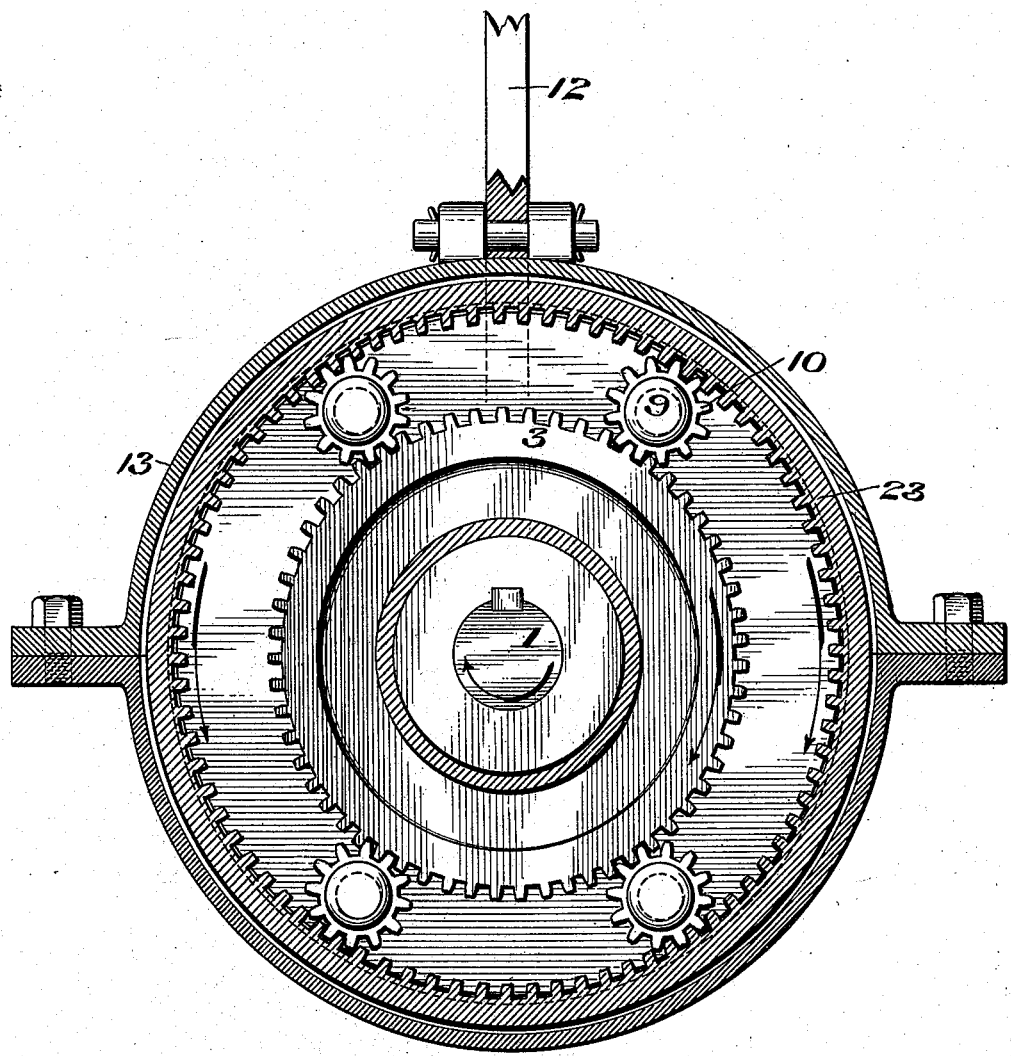

899,396.

Patented Sept. 22, 1908.
6 SHEETS—SHEET 3.

Witnesses
L. Douville,
P. F. Nagle.

Inventor
Frank E. Harthan.
By Wiedersheim Fairbanks
Attorneys

F. E. HARTHAN.
REVERSING CLUTCH MECHANISM.
APPLICATION FILED JAN. 8, 1908.

899,396.

Patented Sept. 22, 1908.
6 SHEETS—SHEET 4.

Witnesses
L. Douville,
P. F. Nagle.

Inventor
Frank E. Harthan.

By Wiedersheim Fairbanks
Attorneys

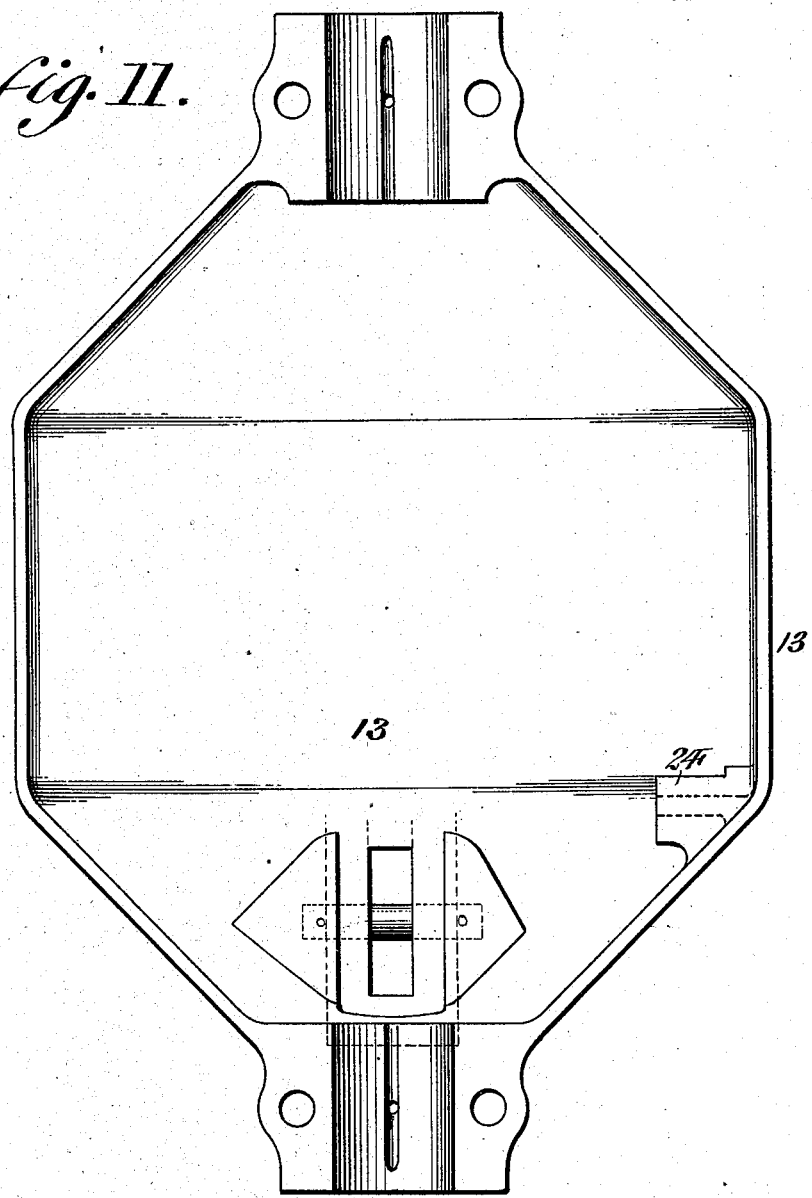
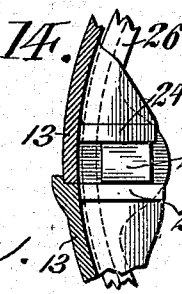

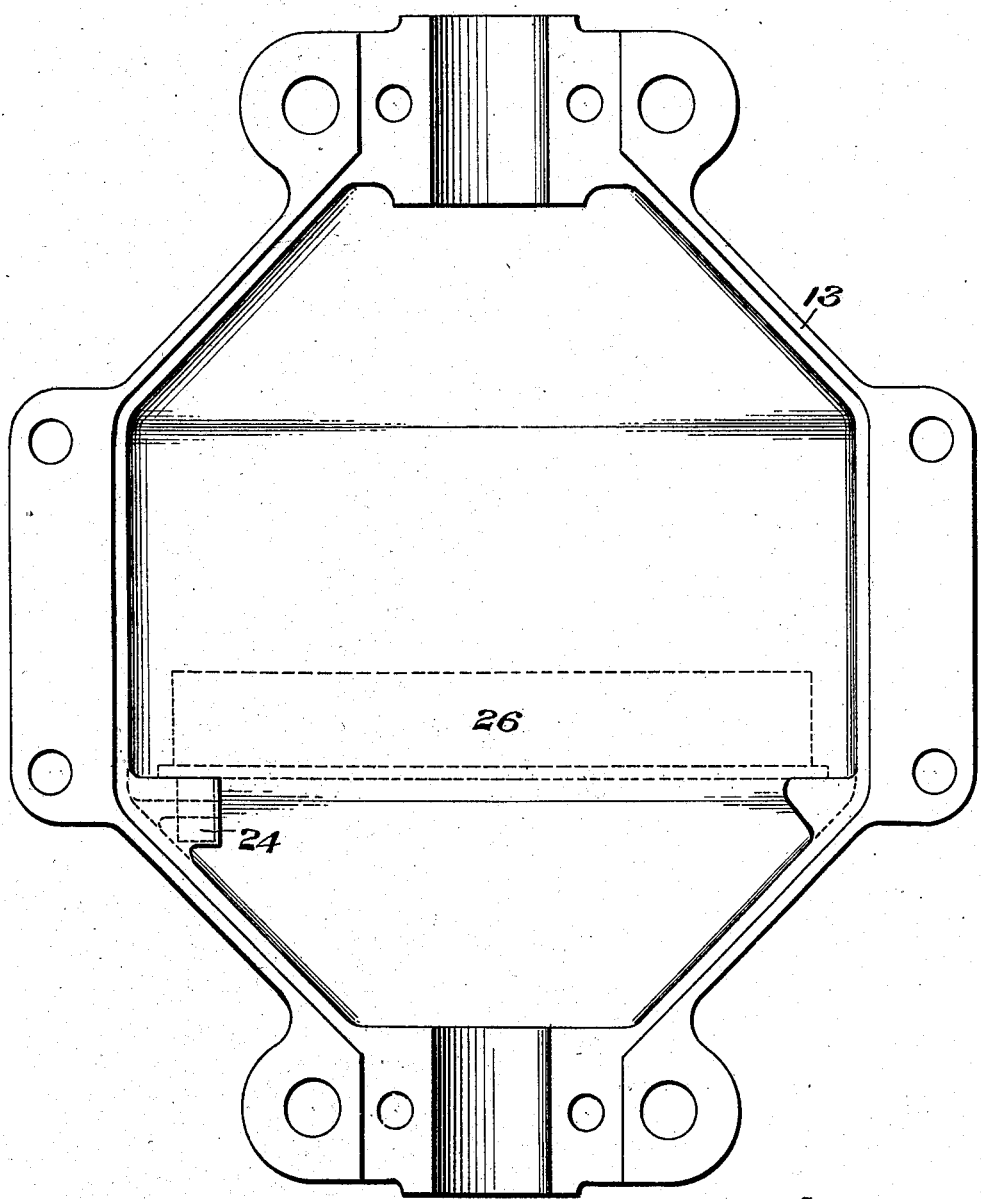

UNITED STATES PATENT OFFICE.

FRANK E. HARTHAN, OF TRENTON, NEW JERSEY, ASSIGNOR TO LOUIS C. TAYLOR, TRUSTEE, OF TRENTON, NEW JERSEY.

REVERSING-CLUTCH MECHANISM.

No. 899,396.  Specification of Letters Patent.  Patented Sept. 22, 1908.

Application filed January 8, 1908. Serial No. 409,777.

*To all whom it may concern:*

Be it known that I, FRANK E. HARTHAN, a citizen of the United States, and residing in the city of Trenton, county of Mercer, State of New Jersey, have invented a new and useful Reversing-Clutch Mechanism, of which the following is a specification.

My invention relates to an improved friction clutch adapted for general use in connection with shafting and is especially adapted for transmitting power from the engines or other motors of launches, automobiles or the like to the propelling mechanism.

It consists of annular flanged disks connected directly or indirectly with the driving or driven shafts and which disks may be locked together by suitable means to effect rotation in one direction and one locked relative to the other to effect rotation in the opposite direction.

It further consists of other novel features of construction all as will be hereinafter fully set forth.

For the purpose of explaining my invention, the accompanying drawing illustrates a satisfactory reduction of the same to practice, but the important instrumentalities thereof may be varied and so it is to be understood that the invention is not limited to the specific arrangement and organization shown and described.

Figure 4:
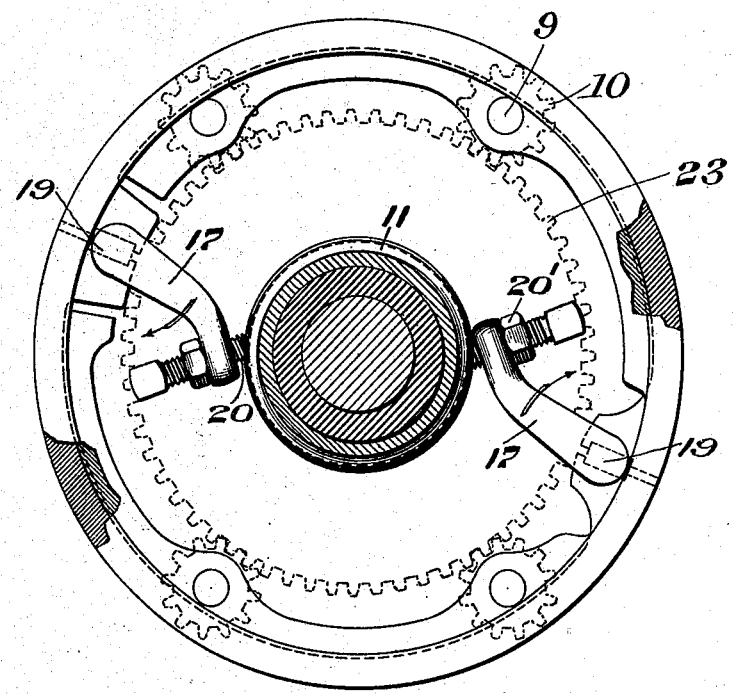
Figure 5:
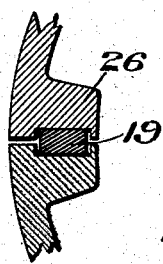
Figure 6:
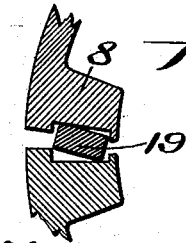
Figure 7:
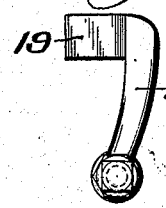
Figure 8:
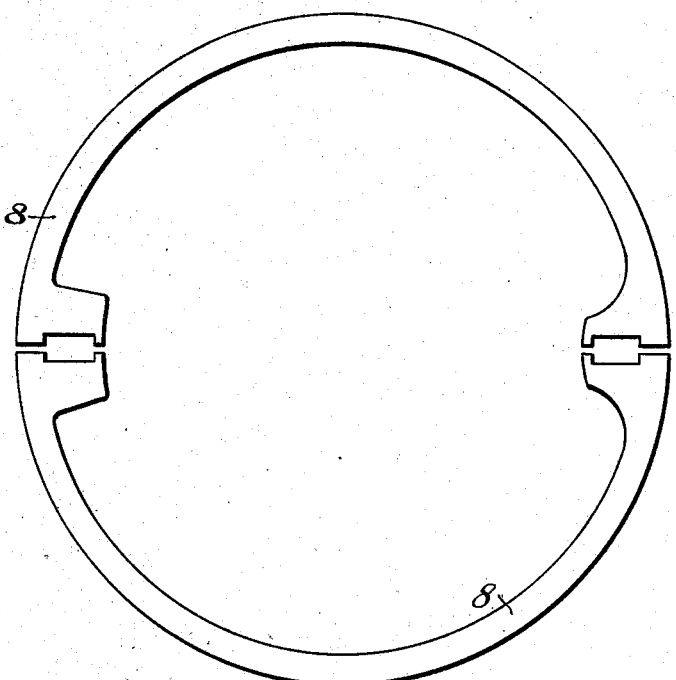
Figure 9:
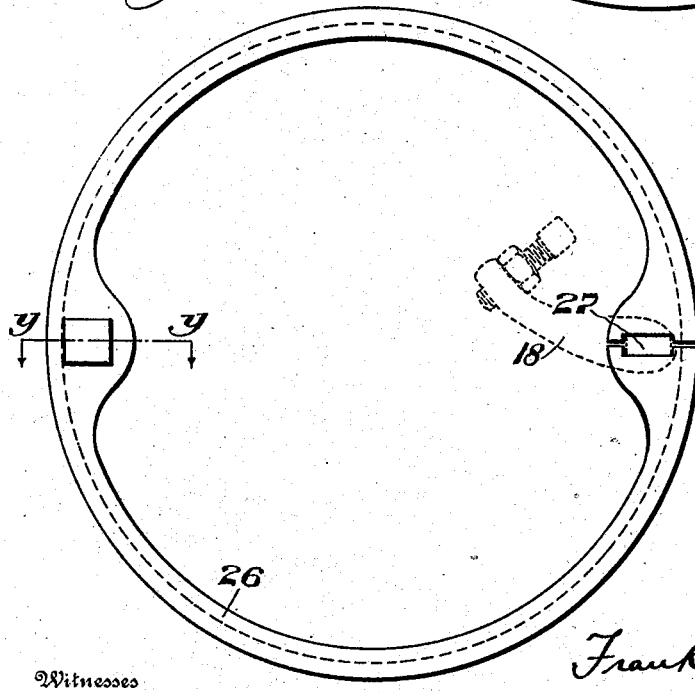
Figure 10:
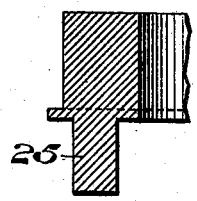

Figure 1 represents a vertical section through a clutch embodying my invention. Fig. 2 represents a section through a sliding hub. Fig. 3 represents a section on line $x$—$x$, Fig. 1. Fig. 4 represents a view of the friction ring construction and operating levers therefor. Figs. 5 and 6 represent the friction rings in detail. Fig. 7 represents the operating lever for the friction rings. Figs. 8 and 9 represent friction rings. Fig. 10 represents a section on line $y$—$y$, Fig. 9. Fig. 11 represents one side of the inclosing casing. Fig. 12 represents a view of the other side of the inclosing casing. Fig. 13 represents a view showing the connection between the one friction ring and casing. Fig. 14 represents a section of the same on line $z$—$z$, Fig. 13.

Similar numerals of reference indicate corresponding parts in the figures.

Referring to the drawings: 1 designates a power shaft driven by any suitable means and which transmits the power to a second shaft 2 which is connected to a launch propeller, the running gear of an automobile or the like by any suitable gearing. The said shaft 1 has mounted thereon in any suitable manner the gear 3 and a loose sleeve 4 carrying a disk 5 herein shown as integral, provided with an annular flange 6 having a part of its circumference cut away and forming a recess 7 in which is located a friction ring 8. The disk 5 has mounted thereon, as by the bolts 9, the planetary gears or pinions 10 adapted to engage an internal gear to be hereinafter described. On the sleeve 4 a sliding hub 11 is mounted which is adapted to be operated by a lever 12 extending through the casing 13 and suitably pivoted thereto. The hub 11 is provided with an enlarged section 14 forming cone surfaces 15 and 16 for the purpose of engaging and operating levers 17 and 18, which levers may be of any form suitable for the purpose but are preferably provided with a flat end 19 and on the cone engaging end carry a set screw 20 and check nut 20' to allow of adjustment between the contacting surfaces.

Suitably secured to the shaft 2 is a disk 21 also provided with an annular flange 22 in the interior of which is the gear 23 meshing with the planetary pinions 10. It will be noted that as the shaft 1 rotates the gear 3, the pinions 10 which are in mesh therewith through the spindles 9 carry the annular flange and with it the friction ring 8 in the same direction as the shaft is rotating, the pinions merely running around the internal gear of the flange 22. Should, however, the ring 8 be expanded by turning levers 17 it will engage the flange 22 and the disks 5 and 21 are immediately locked together and movement of the pinions 10 relative to the flange 22 is prevented and the disk 21 carried around in the same direction as shaft 1 and with it the driven shaft 2.

Referring to Figs. 13 and 14, it will be seen that the casing 13 is provided with interior lugs 24 spaced apart in order to receive a projection 25 formed on a second friction ring 26. This ring 26 is positioned within the flange 6 and is provided with an opening 27 similar to that in the ring 8 and adapted for the reception of an operating lever 18 similar in construction to the levers 17, and adapted to be operated by cone projection 16. This ring 26 is in position to be expanded and engage the flange 6 and upon such action taking place, rotation of the pinions 10 through the annular internal gear causes the flange 22 which is free to move, to rotate in a direction opposite or reverse to that of the shaft 1.

It will be noted that when hub 11 is in its central position neither of the cone surfaces 15 or 16 engage their respective levers 17 or 18 and consequently shaft 1 revolves without transmitting any motion to shaft 2 which therefore remains stationary. This position of the hub is the neutral position and the driven mechanism is at rest.

The operation of the device is as follows:— For forward movement of the shaft 2 the lever 12 is operated to shift the hub 11 inwardly of the clutch until the conical projection 15 engages and pushes outwardly the levers 17. This action tends to turn the ends 19 and consequently expand the friction ring 8 through which expansion it comes into contact with the annular flange 22 and locks the disk members 5 and 21 securely together and rotates the shaft 2 in a forward direction. Attention is called to the slight depression between cone surfaces 15 and 16 the function of which is to retain the levers in set position and prevent the movement of the rotating parts from jarring or striking the hub to cause premature releasing of the clutch. For reverse movement of the shaft 2 the lever 12 is operated in the opposite direction to shift the sliding hub 11 so that the projection 16 engages the lever 18 and turns it to expand the ring 26 into contact with flange 6. As this friction ring 26 is fast to the casing 13 the disk flange 6 is locked against movement and the pinions 10 driven by gear 3 rotate flange 22 and with it shaft 2 in the reverse direction of the shaft 1.

It will be seen that I have produced a clutch simple in construction, composed of few parts and capable of operating efficiently in a forward or reverse direction.

Having thus described my invention what I claim as new and desire to secure by Letters Patent is:—

1. In a device of the character described, a driving shaft, a gear secured thereto, a disk having an annular flange loosely mounted on said shaft, pinions carried by said disk and meshing with said gear, a driven shaft, a disk secured thereon having an annular flange, a rack in said latter flange adapted to mesh with said pinions, and means between said annular flanges to lock said rack and pinions from independent movement.

2. In a device of the character described, a driving shaft, a gear secured thereto, a disk having an annular flange loosely mounted on said shaft, pinions carried by said disk and meshing with said gear, a driven shaft, a disk secured thereon having an annular flange, a rack in said latter flange adapted to mesh with said pinions, an expansible friction ring between said annular flanges and means to expand said ring.

3. In a device of the character described, a driving shaft a gear secured thereto, a disk having an annular flange loosely mounted on said shaft, pinions carried by said disk and meshing with said gear, a driven shaft, a disk secured thereon having an annular flange, a rack in said latter flange adapted to mesh with said pinions, an expansible friction ring between said annular flanges, means to expand said ring to effect rotation of said driven shaft in one direction and means independent thereof to effect rotation of said driven shaft in the reverse direction.

4. In a device of the character described, a driving shaft, a gear secured thereto, a disk having an annular flange loosely mounted on said shaft, pinions carried by said disk and meshing with said gear, a driven shaft a disk secured thereon having an annular flange, a rack in said latter flange adapted to mesh with said pinions an expansible friction ring between said flanges a second expansible friction ring suitably supported and means to independently expand said adjustable friction rings.

5. In a device of the character described, a driving shaft, an annular flanged disk mounted thereon, a driven shaft an annular flanged disk fixedly secured thereon inclosing said first mentioned disk, gears therebetween, expansible means to lock said disks together and means to lock one disk independent of the other.

6. In a device of the character described, a driving shaft, an annular flanged disk mounted thereon, a driven shaft, an annular flanged disk thereon inclosing said first mentioned disk, gears therebetween, and expansible means interior of each disk whereby independent locking of said disks is permitted.

7. In a device of the character described, a driving shaft, an annular flanged disk mounted thereon, a driven shaft, an annular flanged disk fixedly secured thereon inclosing said first mentioned disk, gears therebetween, means to lock said disks together, and expansible means to lock one disk independent of the other.

FRANK E. HARTHAN.

Witnesses:
CLARENCE WILLETS,
JAMES B. CARTON.